United States Patent [19]

Padalino

[11] Patent Number: 4,809,016

[45] Date of Patent: Feb. 28, 1989

[54] INKJET INTERLACE PRINTING WITH INCLINED PRINTHEAD

[75] Inventor: Marco Padalino, Dallas County, Tex.

[73] Assignees: Ricoh Company, Ltd., Tokyo, Japan; Ricoh Systems, Inc., San Jose, Calif.

[21] Appl. No.: 20,955

[22] Filed: Mar. 2, 1989

[51] Int. Cl.[4] .................... G01D 15/18

[52] U.S. Cl. .................... 346/75

[58] Field of Search .................... 346/75; 430/496, 935, 430/293; 427/14.1, 28

[56] References Cited

U.S. PATENT DOCUMENTS

| | | | |
|---|---|---|---|
| 4,047,184 | 9/1977 | Bassous et al. | 346/75 |
| 4,238,805 | 12/1980 | Paranjpe et al. | 346/75 |
| 4,258,370 | 3/1981 | Paranjpe | 346/75 |
| 4,381,342 | 4/1983 | Van Heyningen | 430/496 |
| 4,401,991 | 8/1983 | Martin | 346/75 |
| 4,533,925 | 8/1985 | Tsao et al. | 346/75 |

*Primary Examiner*—E. A. Goldberg
*Assistant Examiner*—Gerald E. Preston
*Attorney, Agent, or Firm*—Flehr, Hohbach, Test, Albritton & Herbert

[57] ABSTRACT

An inkjet printer is disclosed for printing on a moving web in which at least two rows of nozzles are arrayed on a nozzle plate such that they form an oblique angle with the direction of movement of the moving web. The drops to be printed are charged so that they are deflected so that vertically adjacent nozzles from each of the two rows print overlapping interlaced drops to form a single print row on the moving web. The nozzles in one row are slightly offset from direct vertical alignment with the nozzles in the second row, so that the charging pattern to be applied to the drops generated is highly simplified. Charging is accomplished by a charge plate having slots extending into the plate to a sufficient depth so that the plate may be moved into position after the streams have been started, and may be withdrawn from position before the ink drop streams are turned off. Although the use of slotted charge plates may use two plates, in a preferred form a single plate is used, with alternate slot being of varying depth to allow the passage of streams from the first and second parallel rows. Adjacent cavities may be stimulated by a single acoustic cavity driven by a single stimulator. In this way, the system is adaptable to use for color printing, with a single cavity driving up to four fluid cavities; in this case, a pair of slotted charge plates having slots of sufficient depths to allow the passage of the inkjet streams from four adjacent rows would be utilized.

16 Claims, 5 Drawing Sheets

INKJET INTERLACE PRINTING WITH INCLINED PRINTHEAD

FIELD OF THE INVENTION

This invention relates generally to inkjet printers which may be used as printers for text or images, and more particularly to an inkjet printer of the inclined head type.

BACKGROUND OF THE INVENTION

In inkjet recorders of the type disclosed in this patent application, a pair of rows of orifices receive an electrically conductive recording fluid from a pressurized fluid manifold, and eject the fluid or ink in two rows of streams. The fluid flows through the orifices in a nozzle plate, with the formation or breakoff of the fluid stream into discrete drops being stimulated by the application of a series of traverse waves to the fluid cavity.

Graphic reproduction in recorders of this type is accomplished by selectively charging and deflecting some drops in each of the streams and thereafter, depositing these charged drops in a moving web of paper or other material, with the uncharged drop continuing on an undeflected path and being captured in ink return gutters. The direction of web movement is substantially perpendicular to the rows or orifices in most such systems, such as shown in U.S. Pat. No. 3,701,998. Charging of the drops in such systems is accomplished by application of charge control signals to charging electrodes near the edge of each individual drop stream. As the drops separate from their parent fluid filaments, they carry a portion of the charge applied to the charging electodes. Thereafter, the drops pass through electrostatic fields which have no effect on the uncharged drops, but which cause the charged drops to be deflected in an amount proportional to the strength of the field and the charge carried by the drop.

One problem with printers of this type and with all types of inkjet printers has been attaining sufficient image resolution. Since a discrete number of drops are applied to form the images, it is clear that image definition may be improved by increasing the number of drops, and by providing a proportionate increase in data handling capability. If, however, only one print position per line is serviced by each orifice, the number of drops per unit width, and therefore, the resolution of an image in the direction transverse to the web is limited by the minimum dimensions required for each orifice. The approach taken in the above cited '998 patent is to provide two rows of drop streams which are staggered. The charging of drops in the two rows is timed such that printing from the two rows of streams is in registration. The distance between adjacent streams in each of the rows is therefore twice the distance which would separate streams in a printer of comparable resolution having one row of streams.

In U.S. Pat. No. 4,085,409, an approach is described which is illustrated in FIG. 6 of the present application, specifically, nozzle 1 prints one block of dots along a row, while nozzle 2 prints an adjacent block of dots, the adjacent blocks being strung together to form a line. However, this results in large gaps in the printing if one nozzle fails, or in small gaps at the interface between adjacent blocks of drops due to the inevitable difference in the directionality of the jetstreams.

An effort to deal with this is also disclosed in U.S. Re. Pat. No. 28,219 wherein a printer has a plurality of separate orifice arrays positioned in tandem, with each successive array being laterally offset. The orifices are positioned such that they interlace to provide print capability across the entire web. The orifice arrays extend perpendicular to the direction of movement. In this system, accurate registration of drops is difficult because all the tolerances associated with: the fabrication and assembly of multiple arrays, the synchronization of droplets emanating from different arrays, and the speed variation of the recording medium.

An alternative approach is disclosed in U.S. Pat. No. 3,739,395, for example, wherein uncharged drops are caught and do not print while charged drops from each orifice are deflected by two sets of deflection electrodes to a plurality of discrete print positions on the moving web. In this way, deflection of the drops can be perpendicular or parallel to the direction of web movement. However, in such case, the distance between orifices must be greater than if each orifice is serviced only by a single print position because deflection electrodes must be positioned on all sides of each orifice.

U.S. Pat. No. 3,871,004 discloses a similar system wherein the drops may be deflected obliquely; like the '395 patent, electrode configuration is bulky, limiting inner orifice spacing.

With the continued development of inkjet printers, the use of inkjet color printers has become highly desirable. In inkjet color printers now in use, a plurality of colored inks, for example, cyan, magenta and yellow are ejected to paint a color image in the form of an ink dot pattern. These inkjet color printers have used a method in which an image with half-tones is represented by controlling the quantity of ink drops to be deposited on dot matrices provided one for each of the picture elements on the recording web, and an image with complex colors represented by mixing different colors of ink drops. However, in such known systems, accurate registration of the drop streams on the recording web has been extremely difficult to achieve. Moreover, typically such systems require multiple drop generators, multiple drop charge plates, and multiple deflection electrodes to achieve two separate and additive objectives: high resolution and color. Therefore, in such systems the problems described for the above-cited U.S. Pat. No. 28,219 are compounded.

SUMMARY OF THE INVENTION

An objective of this invention is to provide an improved inkjet printer capable of printing accurately on a recording web and with high resolution.

More particularly, it is an objective of this invention to provide a printing apparatus capable of printing with acceptable quality even in the event of a nozzle failure.

Yet another objective herein is to provide an inkjet printing apparatus capable of printing on a moving web at extremely high speed, and using a very wide array of inkjet nozzles.

Another objective is to provide an inkjet generator in which the number of drop generators, charge plates, deflection electrodes, and charge plate actuators is minimized.

Yet another objective is to provide an inkjet generator in which the nozzles of the printhead may be very closely spaced to maintain high resolution at the printing web.

A further objective herein is to provide an inkjet printhead which is readily adaptable to use for high resolution color printing.

These and other objectives are accomplished by an inkjet printer for printing on a moving web in which at least two rows of nozzles are arrayed on a nozzle plate such that they form an oblique angle with the direction of movement of the moving web. The drops to be printed are charged so that they are deflected so that vertically adjacent nozzles from each of the two rows print overlapping interlaced drops to form a single print row on the moving web.

In an especially useful form of this invention, the nozzles in one row are slightly offset from direct vertical alignment with the nozzles in the second row, so that the charging pattern to be applied to the drops generated is highly simplified.

In a further preferred form of this invention, charging is accomplished by a charge plate having slots extending into the plate to a sufficient depth so that the plate may be moved into position after the streams have been started, and may be withdrawn from position before the ink drop streams are turned off. Although the use of slotted charge plates may use two plates, in a preferred form a single plate is used, with alternate slots being of varying depth to allow the passage of streams from the first and second parallel rows.

In the preferred complete form of the inkjet printer, adjacent cavities may be stimulated by a single acoustic cavity driven by a single stimulator. In this form the system is adaptable to use for color printing, with a single cavity driving up to four fluid cavities; in this case, a pair of slotted charge plates having slots of sufficient depths to allow the passage of the inkjet streams from four adjacent rows would be utilized.

Other objects and advantages of this invention will be apparent from the following description, the accompanying drawings, and the appended claims.

DESCRIPTION OF A PREFERRED EMBODIMENT

Figure 6:
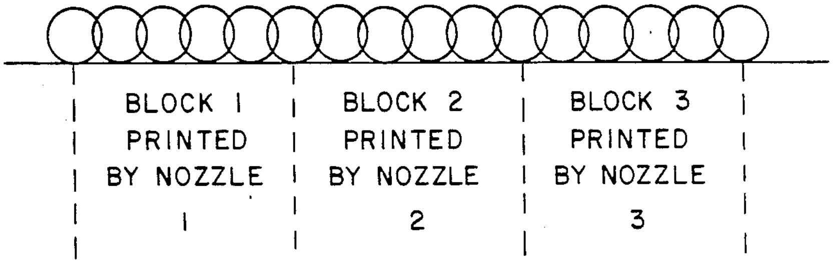
FIG. 6 illustrates the results of a prior art printing apparatus discussed in the background of the invention.

Printing methods used in known high speed inkjet systems employ a printhead with rows of nozzles placed along a line at an oblique angle with the direction of motion of the paper. Each nozzle produces droplets which are sequentially charged at different levels and thus, form a block of adjacent print lines on the paper medium as shown in FIG. 6. The result of this method is that the failure of a nozzle results in a noticeable blank area in the printed page, which renders the print unacceptable.

The printing system of this invention uses different nozzles to produce overlapping print drops in an interlaced manner. Therefore, the failure of a nozzle will result in a lighter image which, especially in high dot density cases, is barely noticeable; more important, the printed information is still legible and can be easily read.

Primarily, this is achieved through the use of two rows of nozzles, A, B, each having N nozzles, $A_1$ through $A_n$ and $B_1$ through $B_n$. The rows form an oblique angle $\alpha$ with the direction of paper motion indicated by arrow 10. Corresponding pairs of nozzles (A1 and B1, A2 and B2) are aligned along a line 12 parallel to the direction of motion of the paper. The result is an interlaced print shown in greater exploded form in FIG. 1B. It can be seen immediately that if any drop, for example, indicated by the number 14, is omitted by clogging of a single nozzle, that the result of this omission is barely noticeable because of the interlaced, overlapping relationship of each adjacent pair of dots.

One difficulty posed by this embodiment is that in order to achieve the proper interlaced relationship of the drops as landed on the medium, the drops from each of the nozzles B must be displaced from landing directly opposite its ejecting nozzle B on the medium by a distance d. This can lead to a slightly more complicated calculation of the charge to be applied, or the voltage to be applied to the deflection plates, although such is well within the skill of the art, and will be discussed below. However, to simplify matters further, an alternative embodiment is illustrated in FIG. 2, wherein the nozzles of row B, the row parallel to the nozzles of row A, are displaced a distance x along a line perpendicular to the direction of motion of the paper. The distance x is set to be equal to the centerline distance between contiguous print dots on the paper, i.e., the distance x would be chosen to be the centerline distance between two dots 16, 18, shown in FIG. 1B. Thus, for example, x=0.0025" for 400 dots per inch resolution.

Figure 7:
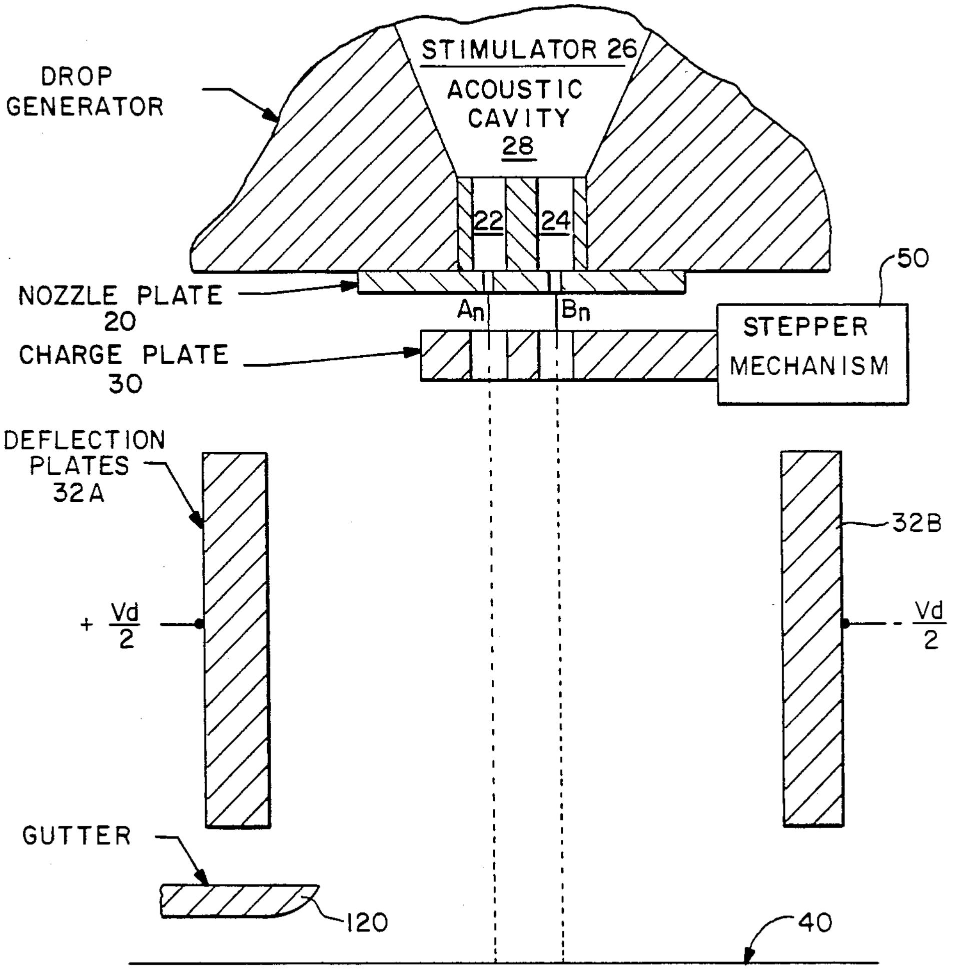
FIG. 7 illustrates the essential elements of an inkjet printing apparatus constructed in accordance with this invention.

In both cases, using the structure of FIG. 7, charging means are provided for charging the drops ejected by the orifices.

FIG. 7 shows an inkjet drop generator including a nozzle plate 20 having the nozzles A, B. Fluid cavities 22, 24 supply ink to the nozzles, and are driven by a common stimulator 26 through an acoustic cavity 28. The drop streams are propelled through nozzle plate 20, through the charge plate 30 for charging and the region defined by deflection plates 32A, 32B to reach the medium 40.

Figure 1:
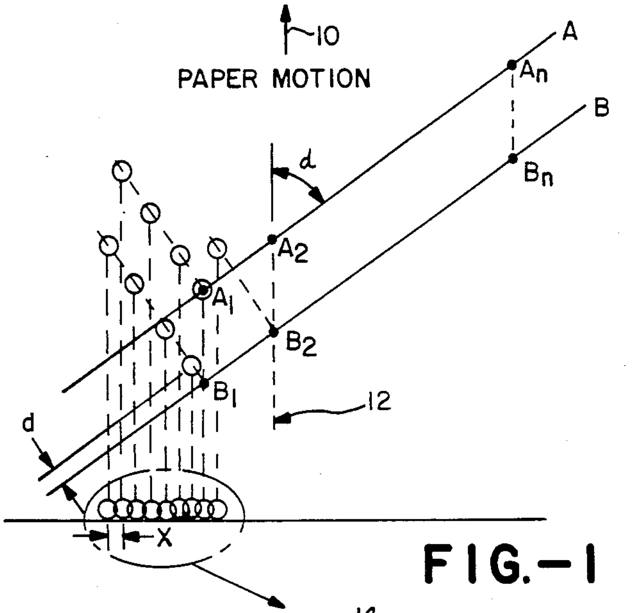
FIG. 1 illustrates the placement of nozzles along a row, and the drops ejected by these nozzles, and their resulting landing points on a moving web.

The structure of FIG. 7 can be used to implement both the nozzle arrays of FIGS. 1 and 2. In both cases, the droplets that land as adjacent interlaced drops are generated by a corresponding pair of nozzles (by a corresponding pair of nozzles is meant a pair of vertically aligned nozzles $A_1$, $B_1$ as shown in FIG. 1, or substantially vertically aligned as in the case of FIG. 2). The droplets are charged to a plurality of charge levels and deflected along the line perpendicular to the rows of drop streams as indicated by following chart:

| Droplet | Charge Level | Displacement |
|---|---|---|
| | Method of FIG. 1 | |
| $A_1$ | 0 (no charge) | 0 |
| $A_2$ | 2Q | 2d |
| $A_3$ | 4Q | 4d |
| $A_4$ | 6Q | 6d |
| $B_1$ | Q | d |
| $B_2$ | 3Q | 3d |
| $B_3$ | 5Q | 5d |
| $B_4$ | 7Q | 7d |
| | Method of FIG. 2 | |
| $A_1$ | 0 (no charge) | 0 |
| $A_2$ | 2Q | 2d |
| $A_3$ | 4Q | 4d |
| $A_4$ | 6Q | 6d |
| $B_1$ | 0 | 0 |
| $B_2$ | 2Q | 2d |
| $B_3$ | 4Q | 4d |
| $B_4$ | 6Q | 6d |

Figure 1B:
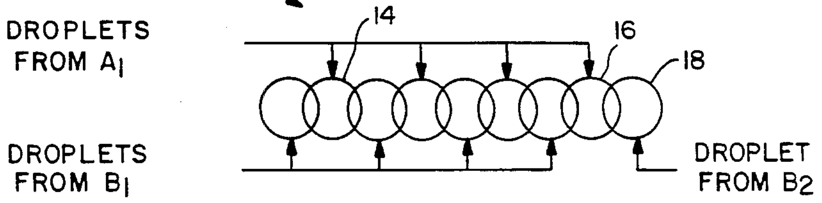
Figure 2:
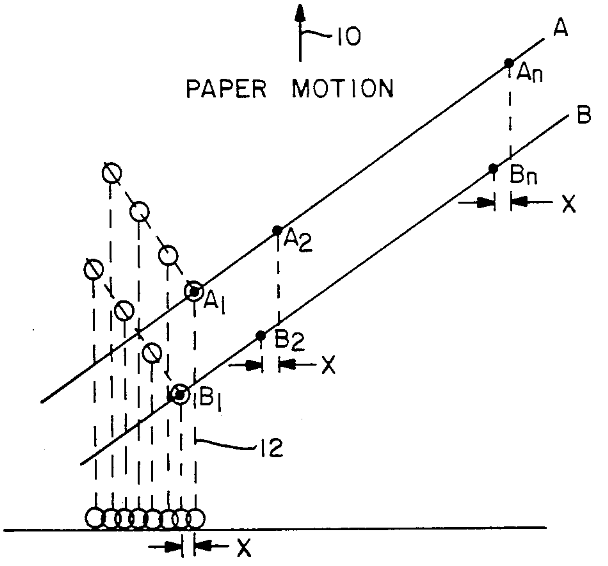
FIG. 2 is an alternative embodiment to FIG. 1, wherein the nozzles in one row are offset from a direct horizontal alignment with the nozzles in the other row to simplify the generation of control signals for dots placed on the web.

In both cases, when ultimately the droplets impinge on the paper, the droplets from one row of nozzles A are interlaced with the droplets from the adjacent nozzle of the row B as illustrated in FIG. 1B. The only difference between the methods and apparatus of FIGS. 1 and 2 is that in the apparatus of FIG. 2 the objective is achieved using the same charge levels and charge drivers for both rows of jet streams, which simplifies the drive electronics to a considerable extent. This is achieved by offsetting one nozzle row from a purely perpendicular alignment by a distance equal to the offset which must occur to produce the interlaced effect. In setting the appropriate deflection voltage $V_d$, and separation of the deflection plates $S_d$, the expression d=by definition to $KQV_d/MS_dV^2$ can be chosen for the particular droplet characteristics (mass, velocity and charge) to produce the desired deflection of the droplets. Moreover, to align the droplets along a line on the paper, the charging signals across all the jet streams are appropriately delayed to account for their distance along the direction of paper motion and for the paper speed in accordance with known technology in this field.

Figure 3:
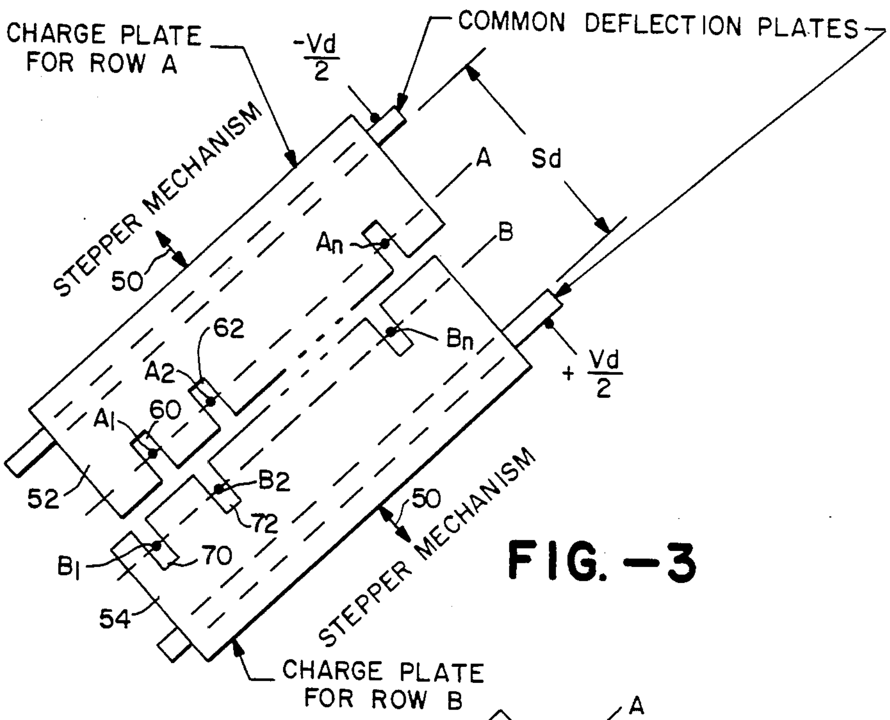
FIG. 3 illustrates a pair of charge plates for charging the ejected drops constructed in accordance with this invention.
Figure 4:
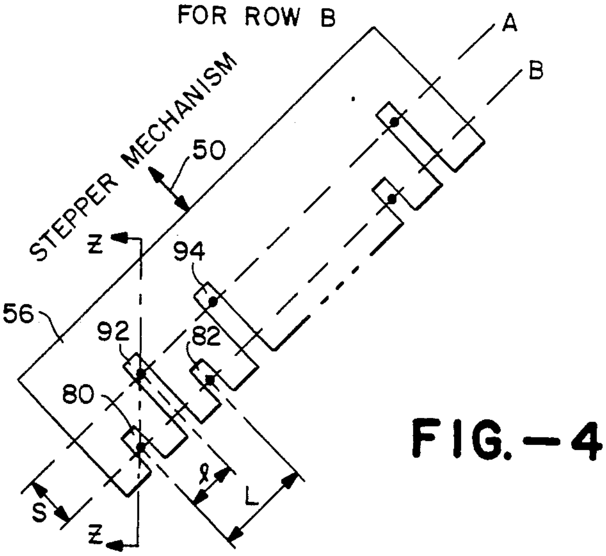
FIG. 4 illustrates an alternative embodiment of FIG. 3 using a single charge plate to charge two rows of drop streams.

FIGS. 3 and 4 illustrate two different forms of the charge plate 30 which may be used in this invention. Both of the plates have the significant advantage of being movable into and out of their drop charging position; (see FIG. 7) by a stepper mechanism 50 generally indicated at the sides of the two charge plates of FIG. 3 or the single charge plate of FIG. 4. Such a mechanism is typically driven by a stepper motor, and is coordinated to move the plates 52, 54 of FIG. 3 or plate 56 of FIG. 4 into position.

In the embodiment of FIG. 3, the charging means comprise a pair of charge plates having slots 60, 62 for passing the drop streams of nozzles A1, A2, $A_n$ and slots 70, 72, 74 for passing the drop streams from orifices B1, B2, $B_n$. The charge plates are moved in from the side of the streams after the streams had been established, and are withdrawn before the streams are turned off, so that no conductive ink splashes on the plates. Such splashing would result in shorting of the conductive leads lying on the charge plates. This is especially significnt in inventions of this type, wherein the orifices are extremely close together, and only a small amount of ink resting on the surface of the charge plate would result in shorting of adjacent orifices.

FIG. 4 shows an alternative and even simpler embodiment wherein a single charge plate 56 is used to charge the drop streams for deflection. The distance between adjacent minor slots 80, 82 for charging the lower of the two streams relative to the position of the charge plate, vs. the centerline-to-centerline distance of the major slots 92, 94 which charge the closer of the two streams to the charge plate is calculated as below.

For FIG. 1: $L_1 = \frac{8x}{\sin\alpha}$ $\quad l_1 = \frac{S}{\tan\alpha}$ .

For FIG. 2: $L_2 = \frac{8x}{\sin\alpha}$ $\quad l_2 = \frac{S}{\tan} + \frac{x}{\sin\alpha}$ in the case were: $\alpha=50°$; the number of charging levels per drop stream is 4; the dot resolution is 400 dots per inch, S=0.015"; and $l_1 = 0.0126''$ $\quad L_1 = 0.026''$ $l_2 = 0.0159''$ $\quad L_2 = 0.026''$ The use of the common charge plate 56 provides many advantages, including a significant cost saving resulting from the use of a single charge plate and a single stepping mechanism instead of two; a space saving around the critical area of the printhead, the ability to reduce the separation distance between row A and row B which also reduces the differential distance of the two rows of jet streams from the gutter.

In this embodiment, a voltage much larger than the largest print charge voltage is used to deflect any unwanted droplet for both jet streams A, B into a common gutter.

Figure 5:
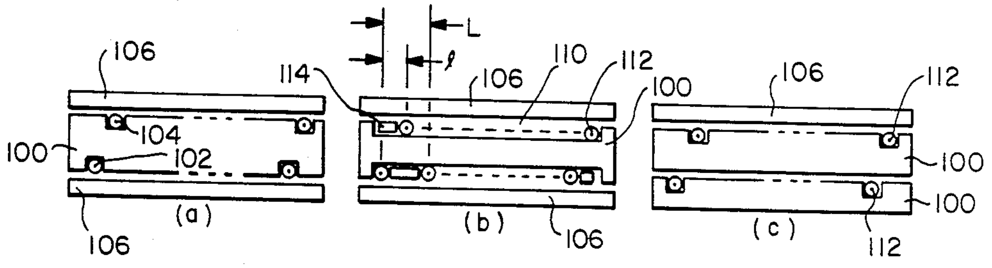
FIG. 5 illustrates a potential form of construction of the nozzle array to eject the drops in the format shown in FIG. 1.

FIG. 5 illustrates three potential ways of making the nozzle plate with two rows of nozzles in the relationship defined above. In the embodiment of FIG. 5A, a central block 100 has inserts 102 cut therein so that the glass fiber may be placed in these spaces. Planar glass sheets 106, 108 are then put in place over the surface of the block 100 to hold the fibers in place. Alternatively, the central block 100 may have a single major recess 110 with the fibers 112 being lain in this recess. Spacer blocks 114 can then be provided to define the separation between adjacent fibers 112. Finally, a separate major block 100 may be used for each row of nozzles 112 with the blocks 100 being stacked one atop the other to form the complete array. Then a final planar block 106 is laid on top of the array to close off the nozzle array. It can also be seen by comparison of this single multiarray nozzle plate with the structure with which it is to be used of FIG. 7, that since both rows of nozzles can be mounted on the same synchronous drop generator, automatic synchronization of the droplets of all jet streams is achieved.

Finally, it is also apparent from an inspection of this array that with the use of a single stimulator and common acoustic cavity to drive the cavity sources 22, 24 for streams A, B, a single gutter 120 may be used to capture all the unwanted drops ejected from the inkjet printer.

Figure 8:
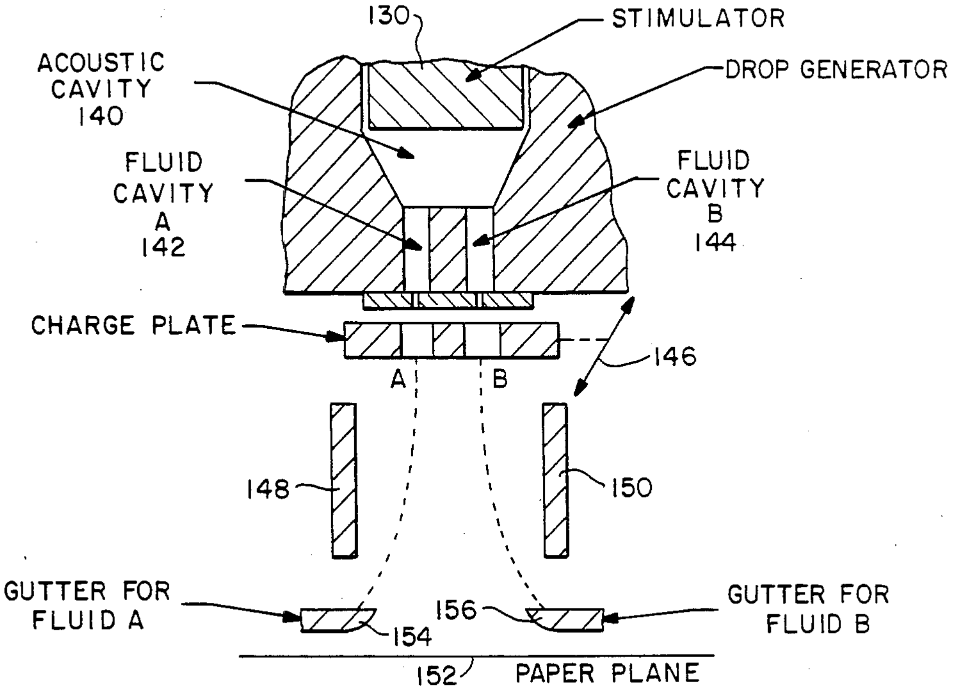
FIG. 8 illustrates an alternative embodiment to FIG. 7 adapted for color printing.
Figure 9:
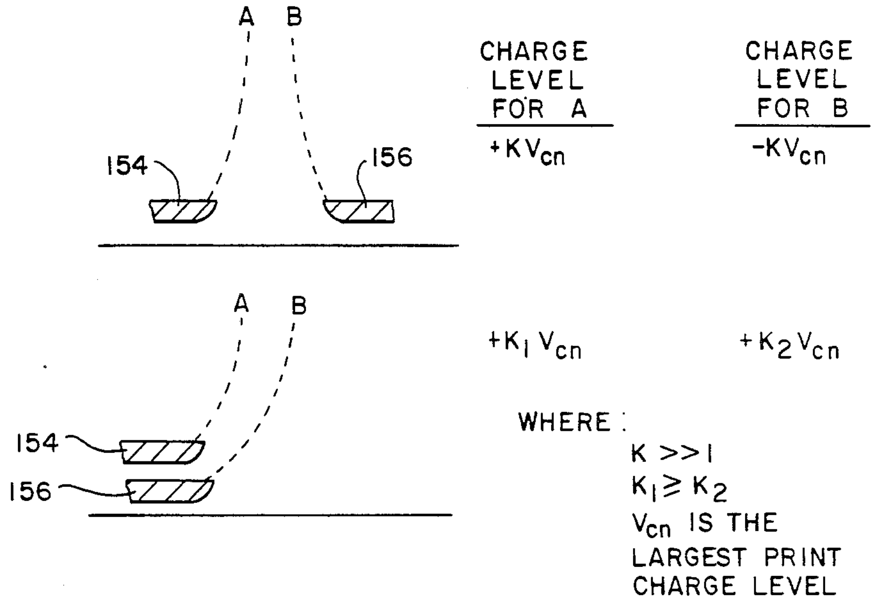
FIG. 9 illustrates the placement of gutters and relative charge levels necessary for color printing using the embodiment of FIG. 8.
Figure 10A:
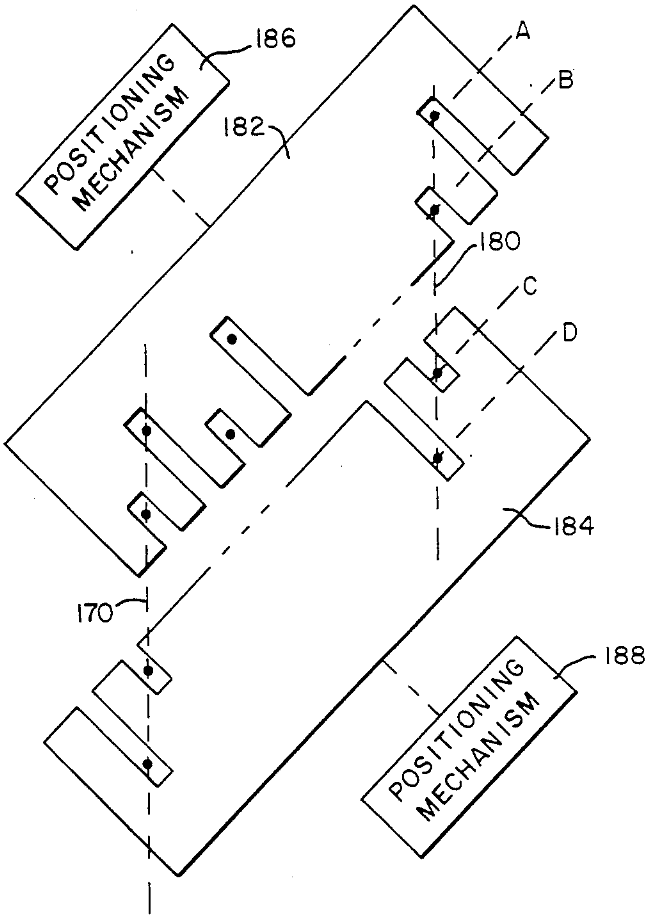
FIGS. 10A and 10B illustrate the construction of a nozzle array and a pair of charge plates constructed in accordance with this invention to charge the inkjet drop streams ejected from the inkjet printer.

The concepts described above can be applied to color printing with the modifications described with respect to FIGS. 8, 9 and 10. FIG. 8 is a sectional view of an inkjet system, taken along the line Z—Z of FIG. 4, showing again a drop generator including a stimulator 130, a common acoustic cavity 140, fluid cavities 142, 144 and a charge plate 146 which is movable into and out of the plane of the paper. The charge applied by the charge plate 146 causes the drops to be influenced by the plates 148, 150 to cause their landing in an interlaced pattern on the paper 152, or for supercharged drops, to be deflected to gutters 154, 156. By appropriate selection of the horizontal displacement of the orifices of one row relative to the other row, and controlling their placement on the page by using equal charge levels on corresponding pairs of droplets, one can control the relative position of droplets of different color on a page to have them land in overlapping positions on the printed page. Of course, since the two rows of drops have different colors, separate gutters are required. Therefore, FIG. 9 shows two alternative placements of the separate gutters 154, 156, and the charge levels necessary to require unwanted drops to land in these gutters.

Figure 10B:
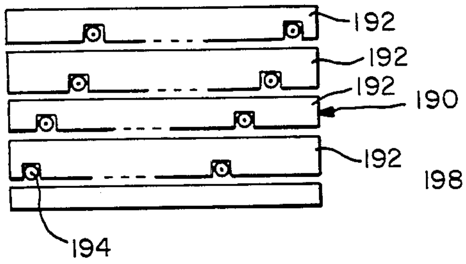
Figure 10C:
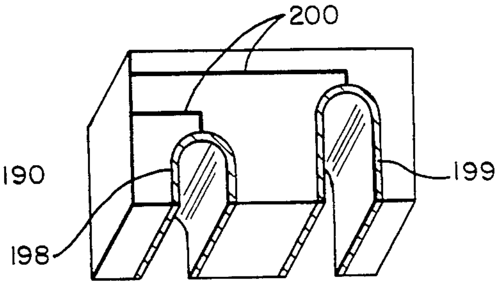
FIG. 10C illustrates the placement of the electrodes on the charge plate to provide electrically isolated charging slots.

FIG. 10 illustrates the modifications to the charge plates which are necessary to implement a 4-color array, wherein cyan, magenta, and yellow, as well as black, are ejected by the four rows of dot streams sources A, B, C, D, with horizontally aligned nozzles along each of the lines 170–180 creating the desired overlap dot printing on the page. In order to minimize the depth of the major and minor slots into the charge plates, two charge plates 182, 184 are provided, driven by separate positioning mechanisms 186, 188. These mechanisms may be driven from a common stepper motor to move the plates into position after the drop streams are established, and withdraw the plates before the streams are turned off to positions adjacent the drop stream passage region. The drop streams themselves can be ejected from nozzle plates fabricated according to one of the methods described with respect to FIG. 5, an example of which is shown in FIG. 10B at array 190. This array 190 consists of a plurality of building block plates 192, each carrying nozzles for one row so that the horizontal displacement of the nozzles 194 can be set. Then by a slight relative shift in the position of the nozzles, the vertical displacement of the nozzles is achieved, together with the desired oblique angle to the paper movement path. FIG. 10C illustrates how the separate electrodes 198, 199 may be led to each slit of the charge plate with control leads from a data base source 200 applying the appropriate signal levels to each slit for charging of the drop.

The merits of the design shown herein lie in its low cost, accuracy, and compactness. It is apparent that the number of drop generators is reduced to one instead of four, the number of charge plates to two instead of four, the number of deflection electrodes to one instead of four, the number of charge plate actuators to two instead of four. The distance from the first to the fourth row of jet streams can be as low as 0.030 inches instead of 5 to 10 inches. The synchronization of the jet stream is essentially automatic, instead of requiring servo control with special circuitry. Thus, the simplicity of this invention as compared to the prior art is apparent.

Other features and advantages or modifications to this invention may become apparent to a person of skill in the art who studies this disclosure. Therefore, the scope of this invention is to be limited only by the following claims.

What is claimed:

1. An inkjet printer for printing on a web moving in a given direction, a plurality of print positions being defined across the width of the web, said printer comprising orifice means for generating a row of drop streams, said orifice means for forming a single print row along a line perpendicular to the direction of motion of the paper comprising first and second parallel rows of orifices arrayed along lines at an oblique angle to the direction of motion of the paper and to the print row to be formed thereby, charging means for selectively charging each drop in said drop streams to one of a plurality of charge levels, gutter means extending along said rows of drop streams for capturing non-printing drops of said drop streams, and deflection plate means for generating a drop deflection field substantially perpendicular to said rows of drops, and of a controlled magnitude such that the drops in said first and second rows of drop streams are directed to strike said web in interlaced positions along a single print row on said web, drops from adjacent orifices in one of said rows striking non-adjacent drop positions along said single print line.

2. A printer as in claim 1 wherein said orifices of said first row are vertically aligned with the orifices of said second row along the direction of paper movement, said charging means comprising a charge plate having a plurality of electrically isolated charging notches, one for each of said ink orifices, and a conductive region surrounding each of said charging notches for selectively charging each of said drops so that said individual dot interlaced print row is achieved.

3. A printer as in claim 1 wherein said ink orifices in said first row for printing contiguous dots in said interlaced print row are displaced from vertical alignment with ink orifices in said second row by a distance equal to the centerline-to-centerline distance between contiguous dots occupying said interlaced positions in said single print row.

4. A printer as in claim 1 wherein said orifice means comprise an ink supply channel, transducer means supported adjacent said ink channel and operating on ink in said supply channel for projecting said ink drop streams through said orifices toward said web, and a nozzle plate mounted on said transducer support for defining said orifices, and wherein said charging means comprise a pair of charge plates mounted closely adjacent said nozzle plate and parallel to said oblique angle of said rows, one of said charge plate cooperating with each of said rows and having slots extending through each charge plate at an angle perpendicular to said cooperating nozzle array, whereby when the charge plates are in drop charging position the ink streams may pass freely through said slots to reach said web.

5. A printer as in claim 4 wherein said charging means comprise stepper motor means coupled to each of said charge plates and control means for said stepper motor means operative after said ink drop stream is established to move said charge plates into said drop charging position.

6. A printer as in claim 1 wherein said orifice means comprise an ink supply channel, transducer means supported adjacent said ink channel and operating on ink in said supply channel for projecting said ink drop streams through said orifices toward said web, and a nozzle plate mounted on said transducer support for defining said orifices, wherein said charging means comprise a single charge plate mounted closely adjacent said nozzle plate and parallel to said oblique angle of said rows, and having slots extending through said plate at an angle perpendicular to lines defined by said rows of nozzles whereby when said charge plate is in drop charging position the ink streams from both of said rows of orifices may pass freely through said slots to reach said web.

7. A printer as in claim 6 wherein said charging means comprise stepper motor means coupled to said charge plate and control means for said stepper motor means operative after said ink drop stream is established to move said charge plate into said drop charging position.

8. A printer as in claim 7 wherein said charge plate slots are electrically isolated, said charge plate comprising an insulating material and a conductive region surrounding each of said slots for selectively charging each of said drop streams so that said dot interlaced print row from said two rows of orifices is achieved.

9. A printer as in claim 5 wherein said charge plate slots are electrically isolated, said charge plate comprising an insulating material and a conductive region surrounding each of said slots for selectively charging each of said drop streams so that said dot interlaced print row from said two rows of orifices is achieved.

10. An inkjet printer for printing on a web moving in a given direction, a plurality of print positions being defined across the width of the web, said printer comprising orifice means for generating first and second parallel rows of drop streams for forming a single print row along a line perpendicular to the direction of motion of the paper, and comprising first orifice means for generating a row of drop streams, said orifice means for forming a single print row along a line perpendicular to the direction of motion of the paper comprising first and second parallel rows of orifices arrayed along lines at an oblique angle to the direction of motion of the paper and to the print row to be formed thereby, charging means comprising a single charge plate movable from a first position adjacent said drop streams to a second position intersecting said drop streams, said charge plate having first and second rows of slots intersecting said plate perpendicular to said rows of drops to allow passage of said drops through said plate concurrent with selective charging of said drops by electrodes carried on said plate, gutter means extending along said rows of drop streams for capturing non-printing drops of said drop streams, and deflection plate means for generating a drop deflection field substantially perpendicular to said rows of drops, and of a controlled magnitude such that the drops in said first and second rows of drop streams are directed to strike said web in interlaced positions along a single print row on said web, drops from adjacent nozzles in one of said rows striking non-adjacent drop positions along said single print line.

11. A printer as in claim 10 wherein said orifices of said first row are vertically aligned with the orifices of said second row along the direction of paper movement, said charging means comprising a charge plate having a plurality of electrically isolated nozzles, one for each of said ink orifices, and a conductive region surrounding each of said charging orifices for selectively charging each of said drops so that said individual dot interlaced print row is achieved.

12. A printer as in claim 10 wherein said ink orifices in said first row for printing contiguous dots in said interlaced print row are displaced from vertical alignment with ink orifices in said second row by a distance equal to the centerline-to-centerline distance between contiguous dots occupying said interlaced positions in said single print row.

13. A printer as in claim 10 wherein said charging means comprise stepper motor means coupled to said charge plate and control means for said stepper motor means operative after said ink drop stream is established, to move said charge plate into said drop charging position.

14. A printer as in claim 8 wherein said charge plate slots are electrically isolated, said charge plate comprising an insulating material and a conductive region surrounding each of said slots for selectively charging each of said drop streams so that said dot interlaced print row from said two rows of orifices is achieved.

15. A printer as in claim 10 wherein said orifice means comprise at least two ink supply channels adapted to carry different colors of ink to each said row, transducer means supported in a housing adjacent said ink channels and operating on the ink in said channels through an acoustic cavity for projecting said ink drop streams through said orifices toward said web, and a nozzle plate mounted on said transducer support for defining said orifices, and wherein said charging means comprise a pair of charge plates mounted closely adjacent said nozzle plate and parallel to said oblique angle of said rows, one of said charge plates cooperating with each of said rows and having slots extending through each charge plate at an angle perpendicular to said cooperating array, whereby when the charge plates are in drop charging position the ink streams may pass freely through said slots to reach said web, whereby multi-color printing is achieved.

16. A printer as in claim 15 wherein four adjacent rows of ink orifices define sets of vertically aligned nozzles, each of said rows being coupled to an ink supply channel carrying a different color of ink and coupled to said transducer, said charging means charging said drops to be deflected toward said web to form said single lines of interlaced drops.

* * * * *